(12) United States Patent
Kumar et al.

(10) Patent No.: US 7,451,120 B1
(45) Date of Patent: Nov. 11, 2008

(54) DETECTING NOVEL DOCUMENT CONTENT

(75) Inventors: M. Bharath Kumar, Bangalore (IN);
Krishna Bharat, San Jose, CA (US)

(73) Assignee: Google Inc., Sunnyvale, CA (US)

( * ) Notice: Subject to any disclaimer, the term of this patent is extended or adjusted under 35 U.S.C. 154(b) by 103 days.

(21) Appl. No.: 11/378,628

(22) Filed: Mar. 20, 2006

(51) Int. Cl.
*G06F 15/18* (2006.01)

(52) U.S. Cl. ....................................... 706/12

(58) Field of Classification Search ............. None
See application file for complete search history.

(56) References Cited

U.S. PATENT DOCUMENTS

| | | | | |
|---|---|---|---|---|
| 6,606,659 B1 * | 8/2003 | Hegli et al. | ................. | 709/225 |
| 6,622,298 B1 * | 9/2003 | Stamm | ....................... | 717/125 |
| 6,638,313 B1 * | 10/2003 | Freeman et al. | ............. | 715/275 |
| 6,671,805 B1 * | 12/2003 | Brown et al. | ................. | 713/176 |
| 6,725,427 B2 * | 4/2004 | Freeman et al. | ............. | 715/273 |
| 6,731,625 B1 * | 5/2004 | Eastep et al. | ................. | 370/352 |
| 6,754,181 B1 * | 6/2004 | Elliott et al. | ................. | 370/252 |
| 6,772,216 B1 * | 8/2004 | Ankireddipally et al. | .... | 709/230 |
| 6,795,854 B1 * | 9/2004 | Parker et al. | ................. | 709/223 |
| 6,813,265 B1 * | 11/2004 | Henrion | ...................... | 370/378 |
| 6,909,708 B1 * | 6/2005 | Krishnaswamy et al. | .... | 370/352 |
| 6,968,338 B1 * | 11/2005 | Gawdiak et al. | ............ | 707/100 |
| 7,013,306 B1 * | 3/2006 | Turba et al. | .................. | 707/101 |
| 7,036,138 B1 * | 4/2006 | Tash | .............................. | 725/46 |
| 7,043,403 B1 * | 5/2006 | Wang et al. | ................. | 702/185 |
| 7,100,050 B1 * | 8/2006 | Coppersmith et al. | ....... | 713/176 |
| 7,111,020 B1 * | 9/2006 | Gupta et al. | ................. | 707/201 |
| 7,117,188 B2 * | 10/2006 | Guyon et al. | ................. | 706/20 |
| 7,117,367 B2 * | 10/2006 | Carro | ........................ | 713/176 |
| 7,124,147 B2 * | 10/2006 | Perry | ......................... | 707/102 |
| 7,143,104 B1 * | 11/2006 | Turba | ......................... | 707/102 |
| 7,145,898 B1 * | 12/2006 | Elliott | ........................ | 370/352 |
| 7,154,503 B2 * | 12/2006 | Yuan | ......................... | 345/553 |
| 7,158,967 B1 * | 1/2007 | Turba et al. | ................... | 707/4 |
| 7,174,481 B1 * | 2/2007 | Di Fabbrizio et al. | ......... | 714/35 |
| 7,197,497 B2 * | 3/2007 | Cossock | ....................... | 707/7 |
| 7,200,550 B2 * | 4/2007 | Menezes et al. | ............... | 704/10 |
| 7,201,372 B2 * | 4/2007 | Kapturowski et al. | ....... | 271/298 |
| 7,203,866 B2 * | 4/2007 | Di Fabbrizio et al. | ......... | 714/38 |
| 7,218,428 B2 * | 5/2007 | Chang et al. | ................. | 358/524 |
| 7,225,182 B2 * | 5/2007 | Paine et al. | ..................... | 707/3 |
| 7,293,019 B2 * | 11/2007 | Dumais et al. | .................. | 707/5 |
| 7,305,144 B2 * | 12/2007 | Fattal et al. | .................. | 382/274 |
| 7,305,198 B2 * | 12/2007 | Julien | ........................... | 399/69 |
| 7,315,868 B1 * | 1/2008 | Turba | ...................... | 707/104.1 |
| 7,359,902 B2 * | 4/2008 | Ornstein et al. | ............... | 707/10 |
| 7,366,982 B2 * | 4/2008 | Shur et al. | .................. | 715/234 |

(Continued)

OTHER PUBLICATIONS

Robust Document Image Authentication Ming Jiang; Wong, E.K.; Memon, N.; Multimedia and Expo, 2007 IEEE International Conference on Jul. 2-5, 2007 pp. 1131-1134 Digital Object Identifier 10.1109/ICME.2007.4284854.*

(Continued)

*Primary Examiner*—Michael B Holmes
(74) *Attorney, Agent, or Firm*—Harrity & Harrity, LLP

(57) ABSTRACT

A system determines an ordered sequence of documents and determines an amount of novel content contained in each document of the ordered sequence of documents. The system assigns a novelty score to each document based on the determined amount of novel content.

32 Claims, 13 Drawing Sheets

U.S. PATENT DOCUMENTS

| | | | | |
|---|---|---|---|---|
| 7,383,500 | B2 * | 6/2008 | Shur et al. | 715/255 |
| 7,383,502 | B2 * | 6/2008 | Shur et al. | 715/255 |
| 7,386,663 | B2 * | 6/2008 | Cousins | 711/114 |

OTHER PUBLICATIONS

Feature extraction based on fuzzy set theory for handwriting recognition Rodrigues Gomes, N.; Lee Luan Ling; Document Analysis and Recognition, 2001. Proceedings. Sixth International Conference on Sep. 10-13, 2001 pp. 655-659 Digital Object Identifier 10.1109/ICDAR.2001.953871.*

Fast detection of XML structural similarity Flesca, S.; Manco, G.; Masciari, E.; Pontieri, L.; Pugliese, A.; Knowledge and Data Engineering, IEEE Transactions on vol. 17, Issue 2, Feb. 2005 pp. 160-175 Digital Object Identifier 10.1109/TKDE.2005.27.*

Word segmentation of handwritten dates in historical documents by combining semantic a-priori-knowledge with local features Feldbach, M.; Tonnies, K.D.; Document Analysis and Recognition, 2003. Proceedings. Seventh International Conference on Aug. 3-6, 2003 pp. 333-337 vol. 1.*

Discovering sequence association rules with user access transaction grammars Shi Wang; Wen Gao; Jintao Li; Database and Expert Systems Applications, 2000. Proceedings. 11th International Workshop on Sep. 4-8, 2000 pp. 757-761 Digital Object Identifier 10.1109/DEXA.2000.875110.*

Querying XML data by the nested relational sequence database system Ho Lam Lau; Ng, W.; Database Engineering and Applications Symposium, 2003. Proceedings. Seventh International Jul. 16-18, 2003 pp. 236-241.*

Page Segmentation for Content Sequence Watcharabutsarakham, S.; Signal Processing, The 8th International Conference on vol. 2, 16-20 2006 Digital Object Identifier 10.1109/ICOSP.2006.345695.*

Fast generation of long sorted runs for sorting a large file Yen-Chun lin; Yu-Ho Cheng, Application Specific Array Processors, 1991. Proceedings of the International Conference on Sep. 2-4, 1991 pp. 445-456 Digital Object Identifier 10.1109/ASAP.1991.238903.*

Spatiotemporal segmentation and tracking of objects for visualization of videoconference image sequences Kompatsiaris, I.; Strintzis, M. G.; Multimedia Computing and Systems, 1999. IEEE International Conference on vol. 1, Jun. 7-11, 1999 pp. 709-713 vol. 1 Digital Object Identifier 10.1109/MMCS.1999.779286.*

Grid Deployment of Legacy Bioinformatics Applications with Transparent Data Access Blanchet, C.; Mollon, R.; Thain, D.; Deleage, G.; Grid Computing, 7th IEEE/ACM International Conference on Sep. 28-29, 2006 pp. 120-127 Digital Object Identifier 10.1109/ICGRID.2006.311006.*

An integrated neural architecture for recognition, correction and storage of handwritten technical documents Dimitriadis, Y.A.; Coronado, J.L.; Handwriting Analysis and Recognition: A European Perspective, IEE European Workshop on Jul. 12-13, 1994 pp. 20/1-20/7.*

Privacy Preserving Detection of Patterns in Event Sequences Oleshchuk, V.; Intelligent Data Acquisition and Advanced Computing Systems: Technology and Applications, 2005. IDAACS 2005. IEEE Sep. 2005 pp. 450-453 Digital Object Identifier 10.1109/IDAACS.2005.283022.*

S. Cucerzan and D. Yarowsky, "Language Independent Named Entity Recognition Combining Morphological and Contextual Evidence", Department of Computer Science, Center for Language and Speech Processing, Johns Hopkins Univeristy, Baltimore, Maryland, 21218, pp. 90-99, 1999.

David D. Palmer and David S. Day, "A Statistical Profile of the Named Entity Task", The MITRE Corporation, 202 Burlington Road, Bedford, MA 01730, USA, pp. 190-193, 1997.

* cited by examiner

DETECTING NOVEL DOCUMENT CONTENT

BACKGROUND

1. Field of the Invention

Implementations described herein relate generally to document searching and, more particularly, to identifying novel content in searched documents.

2. Description of Related Art

The World Wide Web ("web") contains a vast amount of information. Locating a desired portion of the information, however, can be challenging. This problem is compounded because the amount of information on the web and the number of new users inexperienced at web searching are growing rapidly.

Search engines attempt to return hyperlinks to web pages in which a user is interested. Generally, search engines base their determination of the user's interest on search terms (called a search query) entered by the user. The goal of the search engine is to provide links to high quality, relevant results (e.g., web pages) to the user based on the search query. Typically, the search engine accomplishes this by matching the terms in the search query to a corpus of pre-stored web pages. Web pages that contain the user's search terms are "hits" and are returned to the user as links. Each "hit" may be ranked by the search engine based on various factors, such as, for example, the relevance of the "hit" to the search query.

SUMMARY

According to one aspect, a method may include determining an ordered sequence of documents and determining an amount of novel content contained in each document of the ordered sequence of documents. The method may further include assigning a novelty score to each document based on the determined amount of novel content.

According to another aspect, a method may include assigning a score to a document of a plurality of documents based on a presence of content in the document that is novel relative to content in other documents of the plurality of documents. The method may further include ranking the document among the other documents of the plurality of documents based on the assigned score.

According to a further aspect, a method may include identifying one or more textual sequences that carry information in a document of a plurality of documents and determining an importance of each of the textual sequences relative to the plurality of documents. The method may further include assigning a score t0 the document based on the determined importance of each of the textual sequences.

BRIEF DESCRIPTION OF THE DRAWINGS

The accompanying drawings, which are incorporated in and constitute a part of this specification, illustrate one or more embodiments of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention.

Consistent with aspects of the invention, a temporally ordered sequence of documents (e.g., a sequence of news articles on a given topic, or blog posts) may be returned as the result of a search of a corpus of documents by a search engine and then may be analyzed to identify documents that include content that is novel relative to prior content contained in other documents in the sequence. For example, in the context of news-related documents, the novel content may include facts that were missing from earlier articles on a topic. A novelty score may be assigned to each document based on an amount of novel content contained in the document. This novelty score may be used, for example, to rank documents among one another.

News aggregators, such as, for example, Google News, present news content from multiple on-line news sources in the format of a newspaper. For each news story, multiple news articles (e.g., a news cluster) related to a news story may be displayed. Often the articles within a news cluster have considerable redundancy and the same information is conveyed in many articles. Aspects of the invention can rank articles within news clusters in an optimal way so that the reader encounters novel information rather than redundancy.

A "document," as the term is used herein, is to be broadly interpreted to include any machine-readable and machine-storable work product. A document may include, for example, an e-mail, a website, a business listing, a file, a combination of files, one or more files with embedded links to other files, a news group posting, a blog, a web advertisement, a digital map, etc. In the context of the Internet, a common document is a web page. Documents often include textual information and may include embedded information (such as meta information, images, hyperlinks, etc.) and/or embedded instructions (such as Javascript, etc.). A "link," as the term is used herein, is to be broadly interpreted to include any reference to/from a document from/to another document or another part of the same document.

Overview

Figure 1:
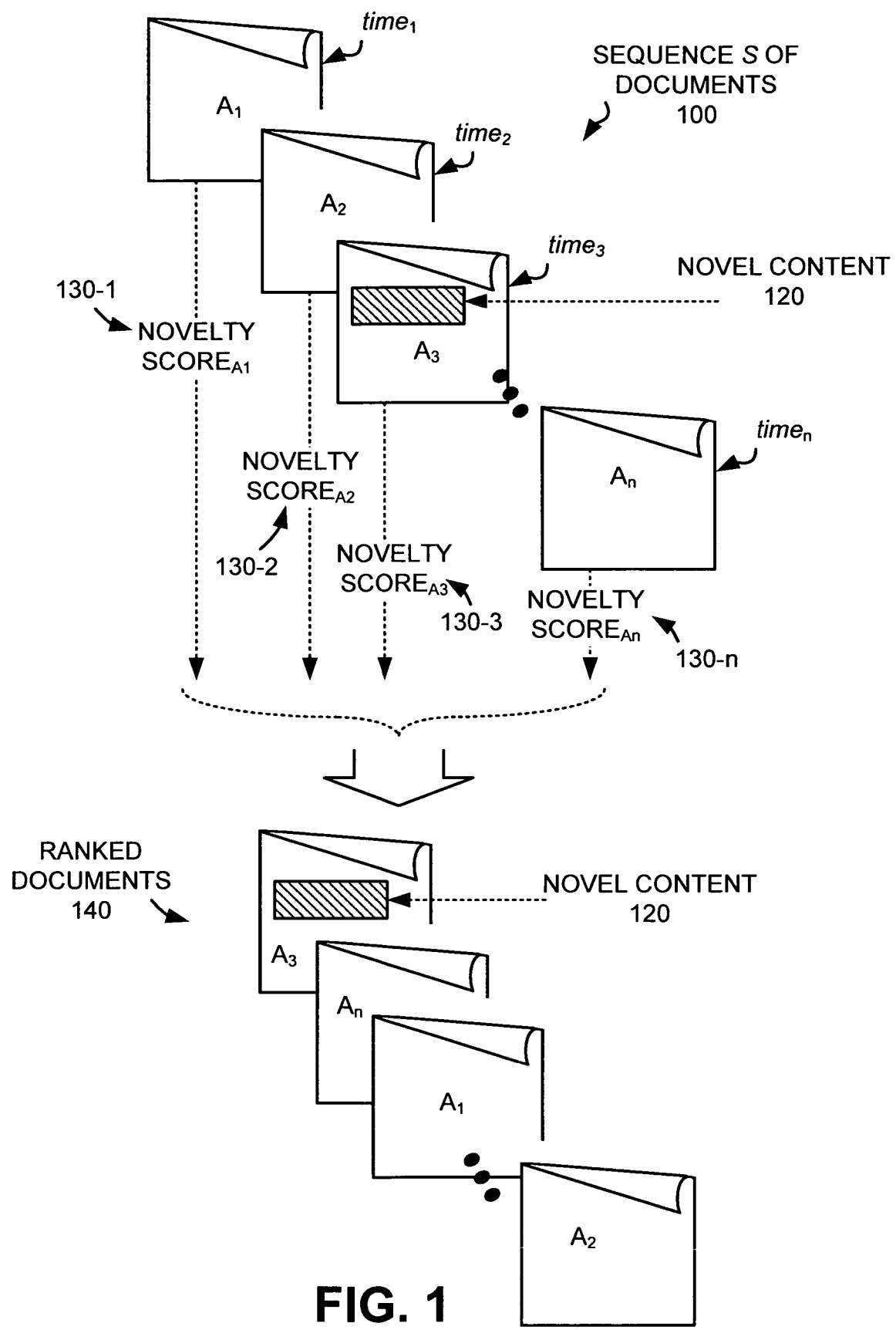
FIG. 1 is an exemplary diagram of an overview of an implementation of the invention.

FIG. 1 illustrates an exemplary overview of a document novel content determination and novelty score assignment process consistent with one implementation of the invention. As shown in FIG. 1, a sequence S of documents 100 may be obtained, for example, by searching a corpus of documents based on a search query to obtain a set of documents that are related to the search query. A timestamp (time$_1$, time$_2$, time$_3$, etc.) may be associated with each document of the sequence S of documents 100. The timestamp may, for example, include a time at which an associated document was published.

Each document of sequence S 100 may be analyzed, as further described in detail below, to identify novel content within the document. The novel content may include, for example, text, or other data, that is novel relative to other documents in sequence S 100. Novelty scores 130-1 through 130-$n$ may then be assigned to respective documents A of sequence S 100 based on the existence of novel content within each document. For example, as shown in FIG. 1, document A$_3$ includes novel content 120 and, thus, may be assigned a novelty score 130-3 that is higher than the novelty scores assigned to the other documents of sequence S 100 that do not include novel content.

As is further shown in FIG. 1, the assigned novelty scores 130-1 through 130-$n$ may be used to rank the documents of sequence S 100 to produce ranked documents 140. As can be seen in the illustrative example of FIG. 1, document A$_3$, which contains novel content 120, has a higher novelty score than other documents of sequence S 100 and, thus, is ranked higher than the other documents in ranked documents 140.

Exemplary Network Configuration

Figure 2:
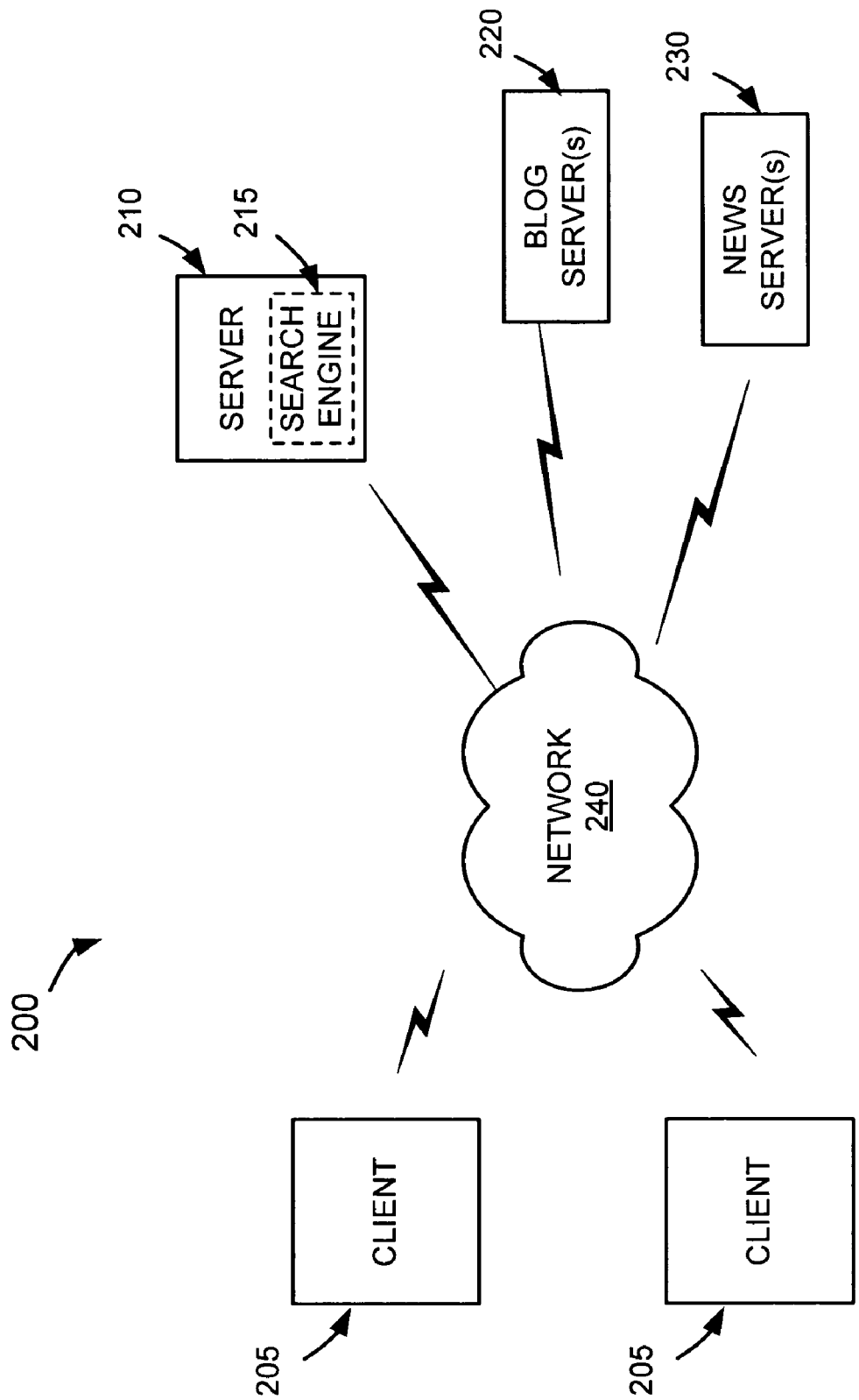
FIG. 2 is an exemplary diagram of a network in which systems and methods consistent with principles of the invention may be implemented.

FIG. 2 is an exemplary diagram of a network 200 in which systems and methods consistent with the principles of the invention may be implemented. Network 200 may include multiple clients 205 connected to server 210, blog server(s) 220, or news server(s) 230 via a network 240. Two clients 205 and servers 210, 220 and 230 have been illustrated as connected to network 240 for simplicity. In practice, there may be more or fewer clients and servers. Also, in some instances, a client may perform one or more functions of a server and a server may perform one or more functions of a client.

Clients 205 may include devices, such as a personal computer, a wireless telephone, a personal digital assistant (PDA), a lap top, or another type of computation or communication device, a thread or process running on one of these devices, and/or an object executable by one of these devices. Clients 205 may implement a browser for browsing documents stored at servers 210, 220 or 230.

Server 210 may include a server entity that accesses, fetches, aggregates, processes, searches and/or maintains documents. In an implementation consistent with the principles of the invention, server 210 may include a search engine 215 usable by users at clients 205. Server 210 may implement a data aggregation service by crawling a corpus of documents hosted on server(s) 220 or 230, indexing the documents, and storing information associated with these documents in a repository of crawled documents. The aggregation service may be implemented in other ways, such as by agreement with the operator(s) of server(s) 220 or 230 to distribute their documents via the data aggregation service. Search engine 215 may execute a search using a query, received from a user at a client 205, on the corpus of documents stored in the repository of crawled documents. The query may, for example, be directed to searching for documents that include blog content or news-related content. Server 220 may provide, to a user issuing a query, a list of documents related to the blog or news-related content that have been ranked based on an amount of novel content that the documents have relative to one another.

Blog Server 220 may host content posted by users from clients 205. News server(s) 230 may store or maintain news-related documents that may be browsed by clients 205, or that may be crawled and copied by server 210. Such documents may include data related to published news stories, such as, for example, news stories from any type of news source, such as, for example, the Washington Post, the New York Times, Time magazine, or Newsweek. Clients 205 and servers 210, 220 and 230 may connect to network 240 via wired, wireless, and/or optical connections.

While servers 210, 220 and 230 are shown as separate entities, it may be possible for one of servers 210-230 to perform one or more of the functions of the other one of servers 210-230. For example, it may be possible that multiple ones of servers 210-230 are implemented as a single server. It may also be possible for a single one of servers 210-230 to be implemented as two or more separate (and possibly distributed) devices.

Network 240 may include one or more networks of any type, including a local area network (LAN), a wide area network (WAN), a metropolitan area network (MAN), a telephone network, such as the Public Switched Telephone Network (PSTN) or a Public Land Mobile Network (PLMN), an intranet, the Internet, a memory device, or a combination of networks. The PLMN(s) may further include a packet-switched sub-network, such as, for example, General Packet Radio Service (GPRS), Cellular Digital Packet Data (CDPD), or Mobile IP sub-network.

Exemplary Client/Server Architecture

Figure 3:
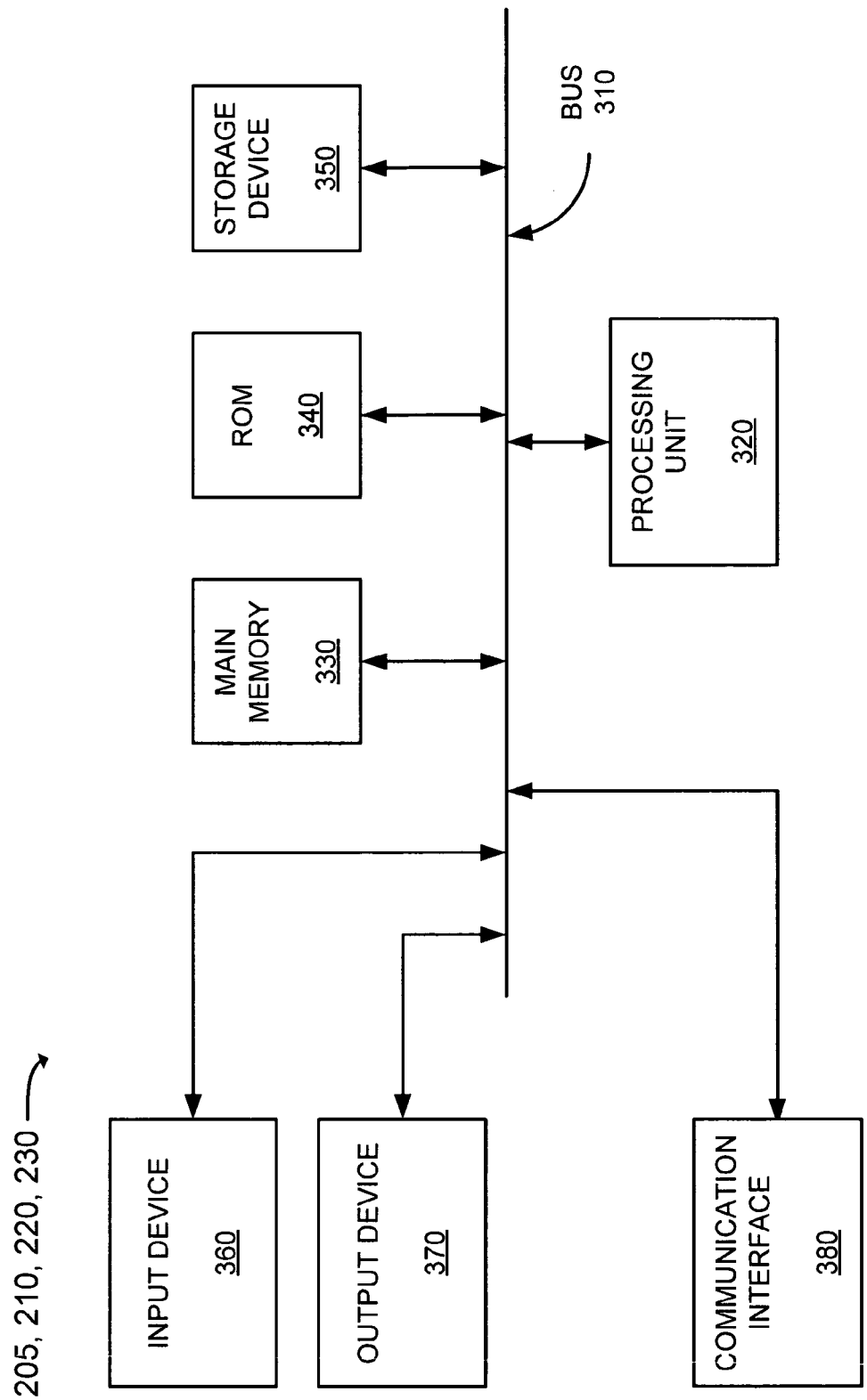
FIG. 3 is an exemplary diagram of a client or server of FIG. 2 according to an implementation consistent with principles of the invention.

FIG. 3 is an exemplary diagram of a client or server entity (hereinafter called "client/server entity"), which may correspond to one or more of clients 205 and/or servers 210-230, according to an implementation consistent with the principles of the invention. The client/server entity may include a bus 310, a processor 320, a main memory 330, a read only memory (ROM) 340, a storage device 350, an input device 360, an output device 370, and a communication interface 380. Bus 310 may include a path that permits communication among the elements of the client/server entity.

Processor 320 may include a processor, microprocessor, or processing logic that may interpret and execute instructions. Main memory 330 may include a random access memory (RAM) or another type of dynamic storage device that may store information and instructions for execution by processor 320. ROM 340 may include a ROM device or another type of static storage device that may store static information and instructions for use by processor 320. Storage device 350 may include a magnetic and/or optical recording medium and its corresponding drive.

Input device 360 may include a mechanism that permits an operator to input information to the client/server entity, such as a keyboard, a mouse, a pen, voice recognition and/or biometric mechanisms, etc. Output device 370 may include a mechanism that outputs information to the operator, including a display, a printer, a speaker, etc. Communication interface 380 may include any transceiver-like mechanism that enables the client/server entity to communicate with other devices and/or systems. For example, communication interface 380 may include mechanisms for communicating with another device or system via a network, such as network 220.

The client/server entity, consistent with the principles of the invention, may perform certain operations or processes, as will be described in detail below. The client/server entity may perform these operations in response to processor 320 executing software instructions contained in a computer-readable medium, such as memory 330. A computer-readable medium may be defined as a physical or logical memory device and/or carrier wave.

The software instructions may be read into memory 330 from another computer-readable medium, such as data storage device 350, or from another device via communication interface 380. The software instructions contained in memory 330 may cause processor 320 to perform operations or processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Exemplary Document Novel Content Determination Process

Figure 4:
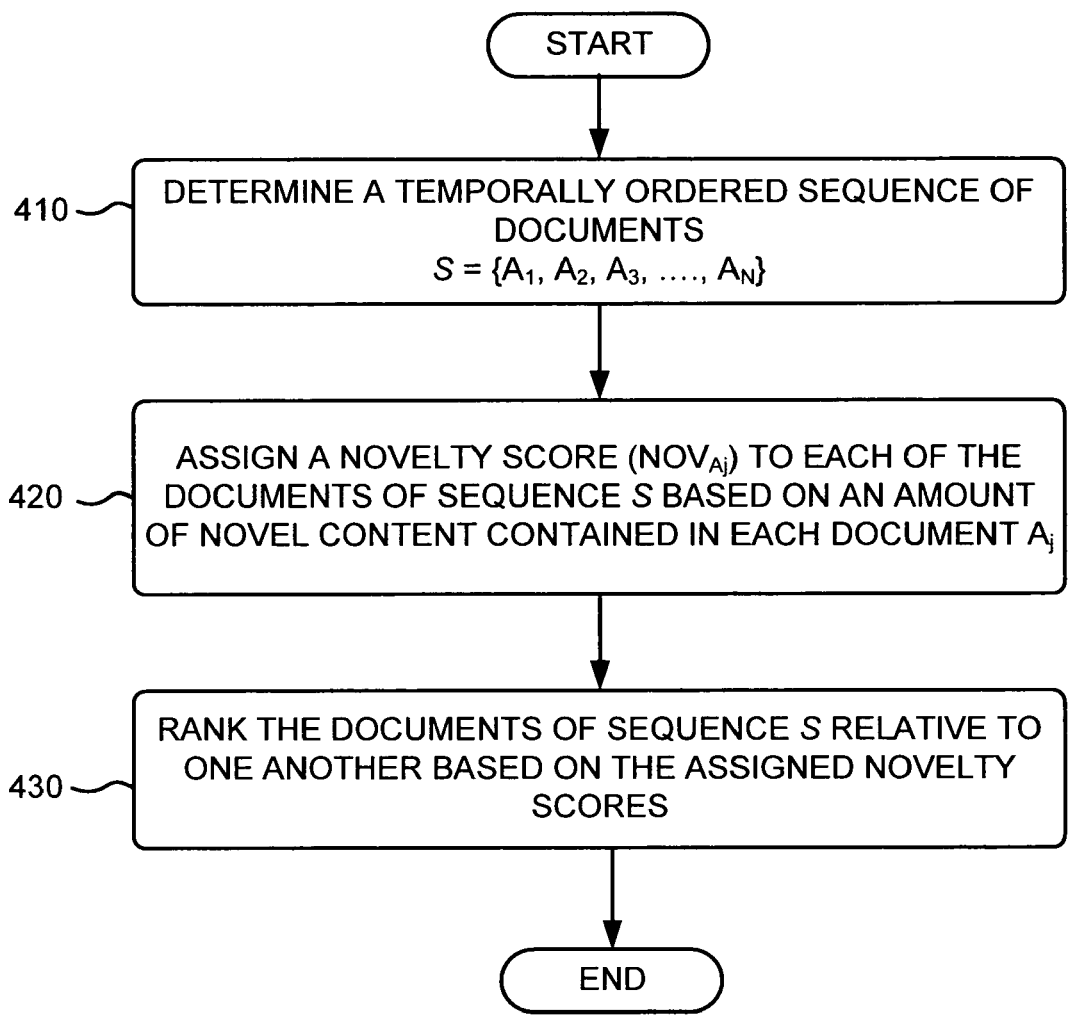
FIGS. 4, 5A and 5B are flowcharts of an exemplary process for determining the existence of novel content in a sequence of documents consistent with principles of the invention.

FIG. 4 is a flowchart of an exemplary process for determining the existence of novel content in a sequence of documents consistent with principles of the invention. The process exemplified by FIG. 4 may be implemented by server 210.

The exemplary process may begin with a determination of a temporally ordered sequence of documents $S=\{A_1, A_2, A_3, \ldots, A_N\}$ (block 410). Search engine 215 of server 210 may search the repository of crawled documents to, for example, identify documents that are related, or relevant to, a search query. In one implementation, the search query may be provided by a user at a client 205. As a result of the search, search engine 215 may return a sequential set of documents $S=\{A_1, A_2, A_3, \ldots, A_N\}$, each of which has an associated time stamp that identifies a respective document's temporal location within the sequence. In one implementation, each of the documents may include a news article, and the sequence of documents S may include a news cluster related to a single news story.

A novelty score ($NOV_{Aj}$) may then be assigned to each of the documents of the sequence S based on an amount of novel content contained in each document $A_j$ (block 420). The identification of novel content, and novelty score assignment based on the identified novel content, is described in further detail below with respect to FIGS. 5A and 5B.

The documents of sequence S may be ranked relative to one another based on the assigned novelty scores (block 430). A novelty score assigned to each document in sequence S may be compared to the novelty scores of other documents in sequence S to rank the documents among one another. Documents with assigned novelty scores that are higher than novelty scores of other documents may be ranked higher in the set of ranked documents.

Figure 5A:
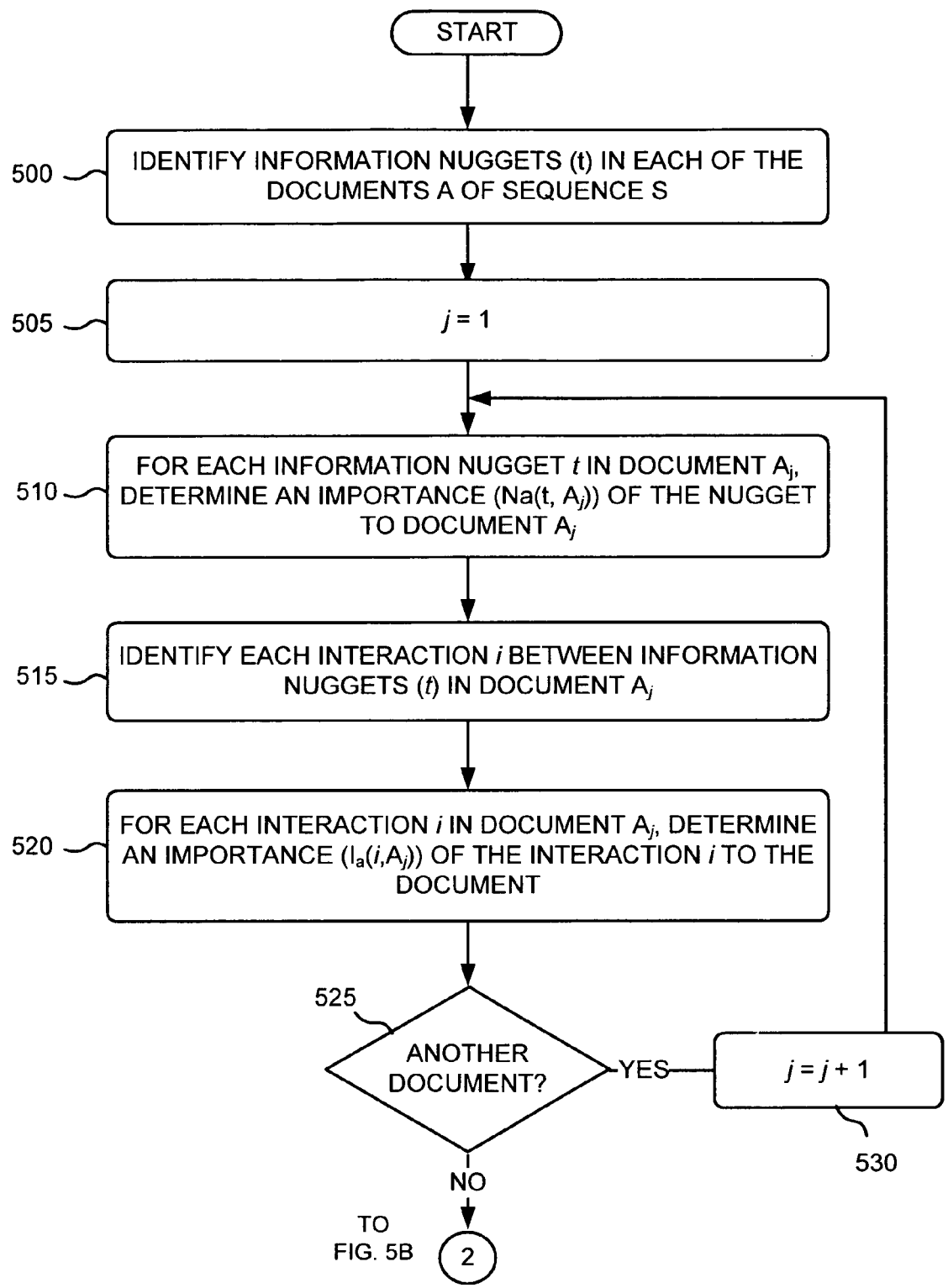
Figure 5B:
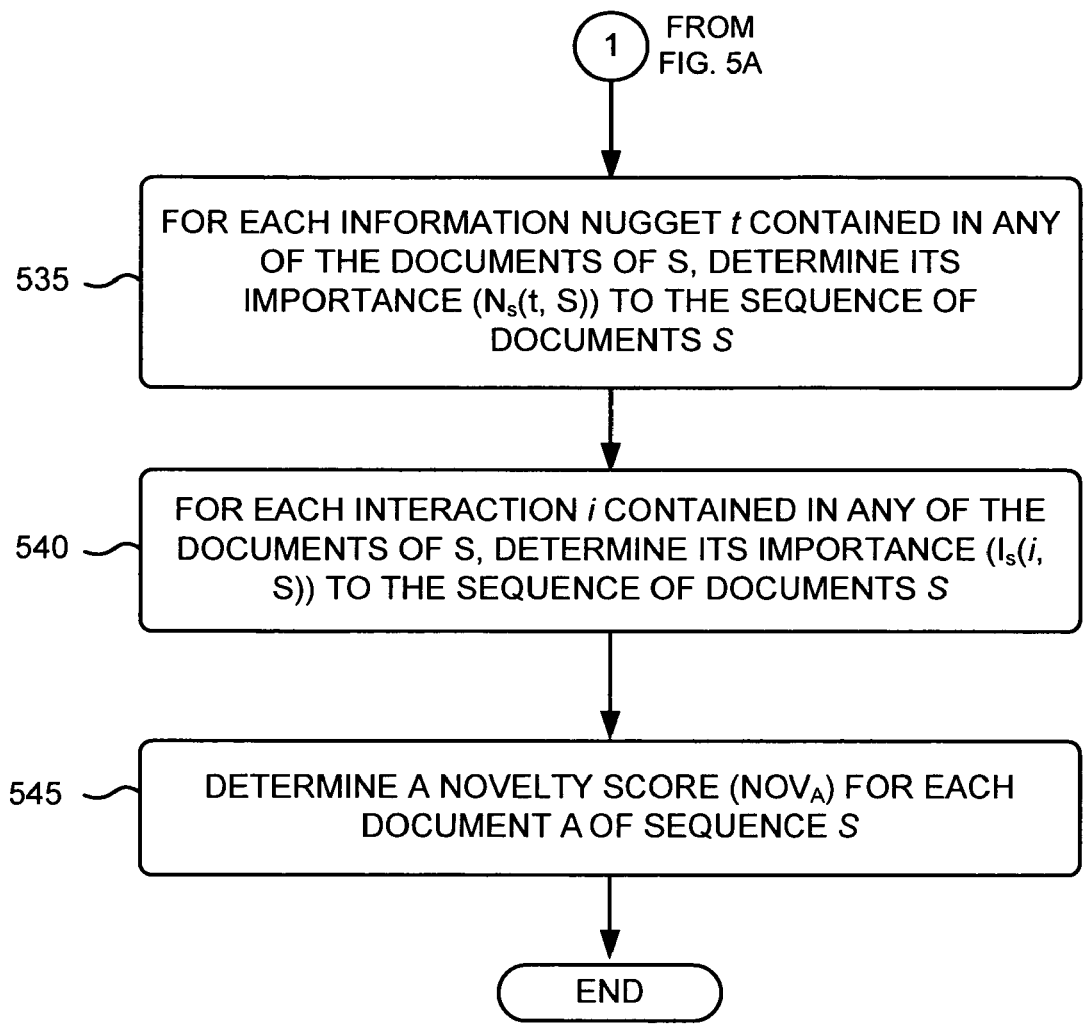
Figure 6:
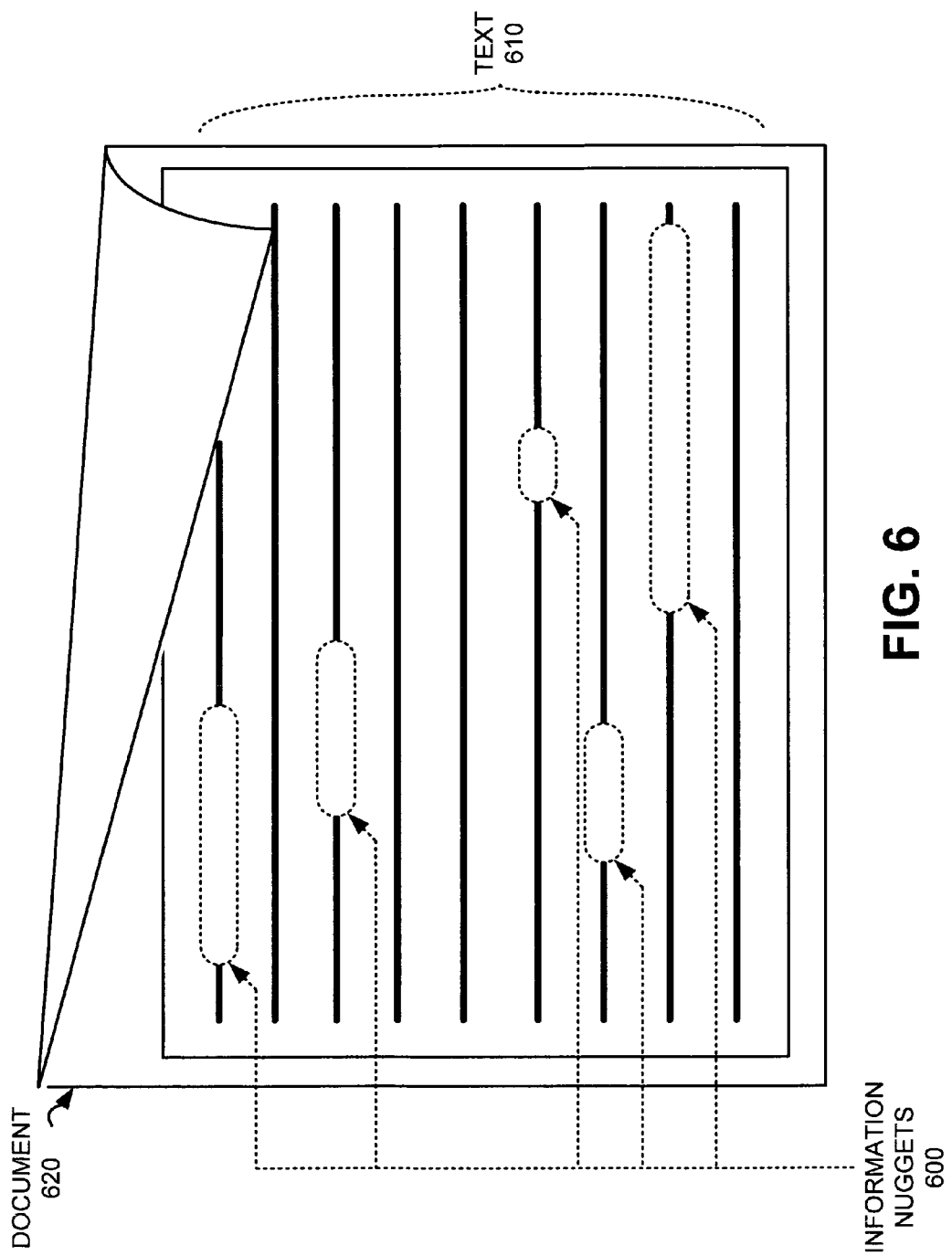
FIG. 6 is a diagram that illustrates "information nuggets" identified in an exemplary document consistent with an aspect of the invention.

FIGS. 5A and 5B are a flowchart that provides further details of the document novelty score assignment of block 420 of FIG. 4. Novelty score assignment may begin with the identification of "information nuggets" (t) in each of the documents A of sequence S (block 500). Each information nugget t may include a sequence of text that carries information. For example, each information nugget t may include a named entity, such as a sequence of words that constitute a name (e.g., Richard Nixon, Charles de Gaulle, WMD, Down Syndrome). Named entities may be recognized using various different techniques. For example, named entities may be recognized based on capitalization (e.g., "New York" is a capitalized sequence), by parsing the sentence structure and identifying noun phrases, or by matching against a previously compiled list of names. Named entities may be recognized using other techniques, such as those described in Cucerzan, S. and D. Yarowsky, 1999; *Language independent named entity recognition combining morphological and contextual evidence*: In Proc. 1999 Joint SIGDAT Conference on EMNLP and VLC; http://citeseer.ist.psu.edu/cucerzan99language.html or in Palmer, D. D. and D. S. Day. 1997; *A Statistical Profile of the Named Entity Task*. In Proc.; http://citeseer.ist.psu.edu/palmer97statistical.html. As another example, an information nugget t may include word sequences (e.g., 1, 2 or 3 word sequences) that appear in the title of a given document. As a further example, an information nugget t may include numbers contained in a given document. The numbers may be quantized suitably (e.g., documents that include content about Mount Everest may mention the mountain's height—some as 29,000 feet and others more precisely as 29,028 feet. These different height values may be determined to be equivalent information nuggets). FIG. 6 illustrates the identification of information nuggets 600 within a textual portion 610 of an exemplary document 620.

Figure 7:
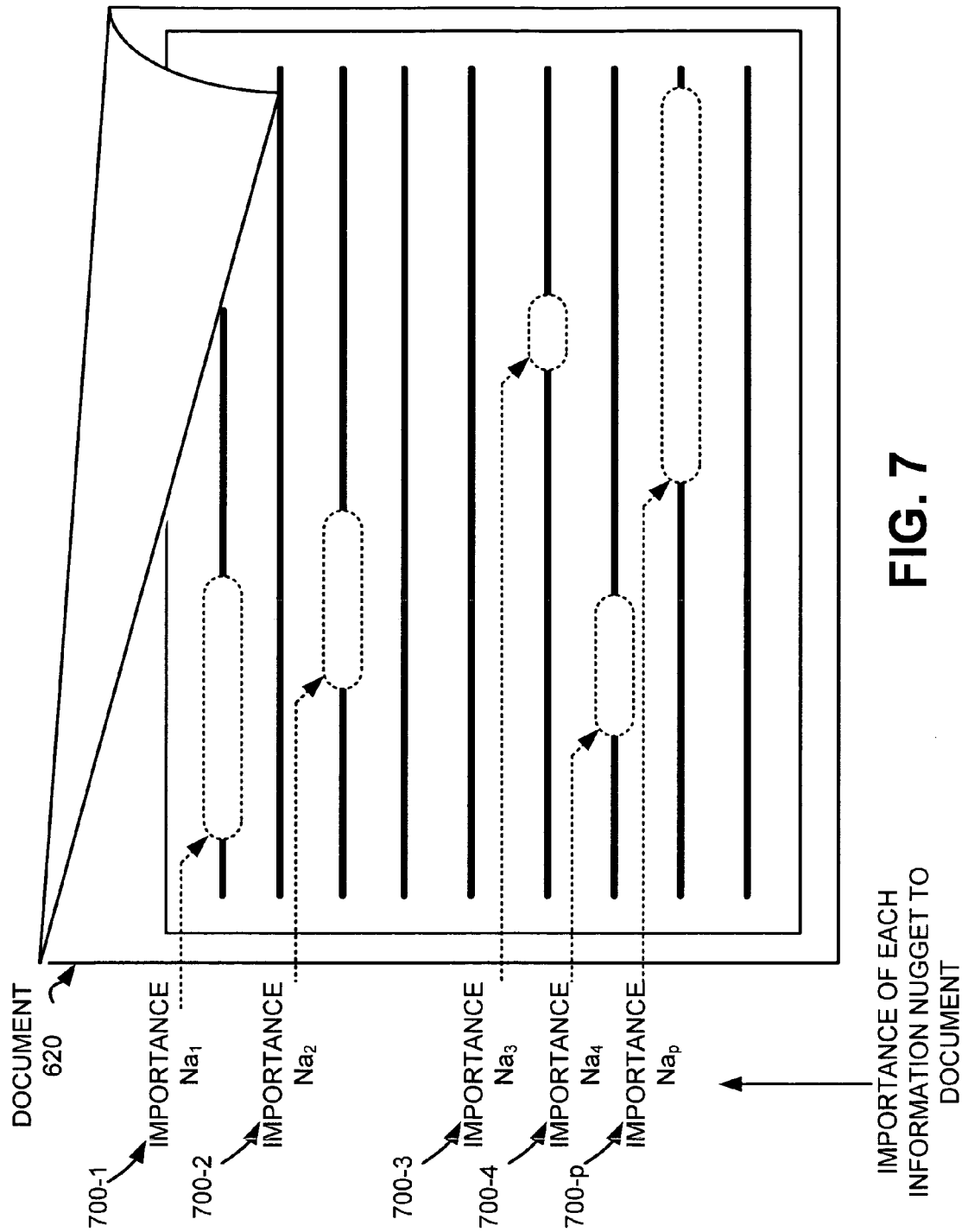
FIG. 7 is a diagram that illustrates the determination of the importance of information nuggets within an exemplary document consistent with an aspect of the invention.

A counter j may be set to one (block 505). The counter j may subsequently be used for identifying which document $A_j$ of the sequence of documents S that is being analyzed. An importance value ($N_a(t, A_j)$) of the nugget t to document $A_j$ may be determined for each information nugget t in document $A_j$ (block 510). Importance value $N_a(t, A_j)$ may measure the importance of nugget t to document $A_j$ and may be determined using various techniques. In one implementation, importance value $N_a(t, A_j)$ may be determined using the relation:

$$N_a(t,A_j)=TF(t,A)*\mathrm{IDF}(t) \qquad \mathrm{Eqn.}\ (1)$$

where TF(t, A) is the term frequency of information nugget t in document A and may be proportional to a number of occurrences of nugget t in document A (e.g., equal to the number of occurrences of t in A) and IDF(t) is the inverse document frequency of nugget t measured over the sequence S of documents. In another implementation, TF(t, A) in Eqn. (1) may be replaced by WTF(t, A) which represents a depth weighted sum of matches of t in document A:

$$WTF(i, A) = \sum \frac{\text{sentences } s \text{ containing pair } i \text{ in } A}{\sqrt{\text{depth of sentence } s \text{ in } A}} \qquad \mathrm{Eqn.}\ (2)$$

where "depth of sentence s in A" is the number of sentences before sentence s in A. FIG. 7 illustrates importance values 700-1 through 700-p determined for each information nugget t of the exemplary document 620 of FIG. 6.

Figure 8:
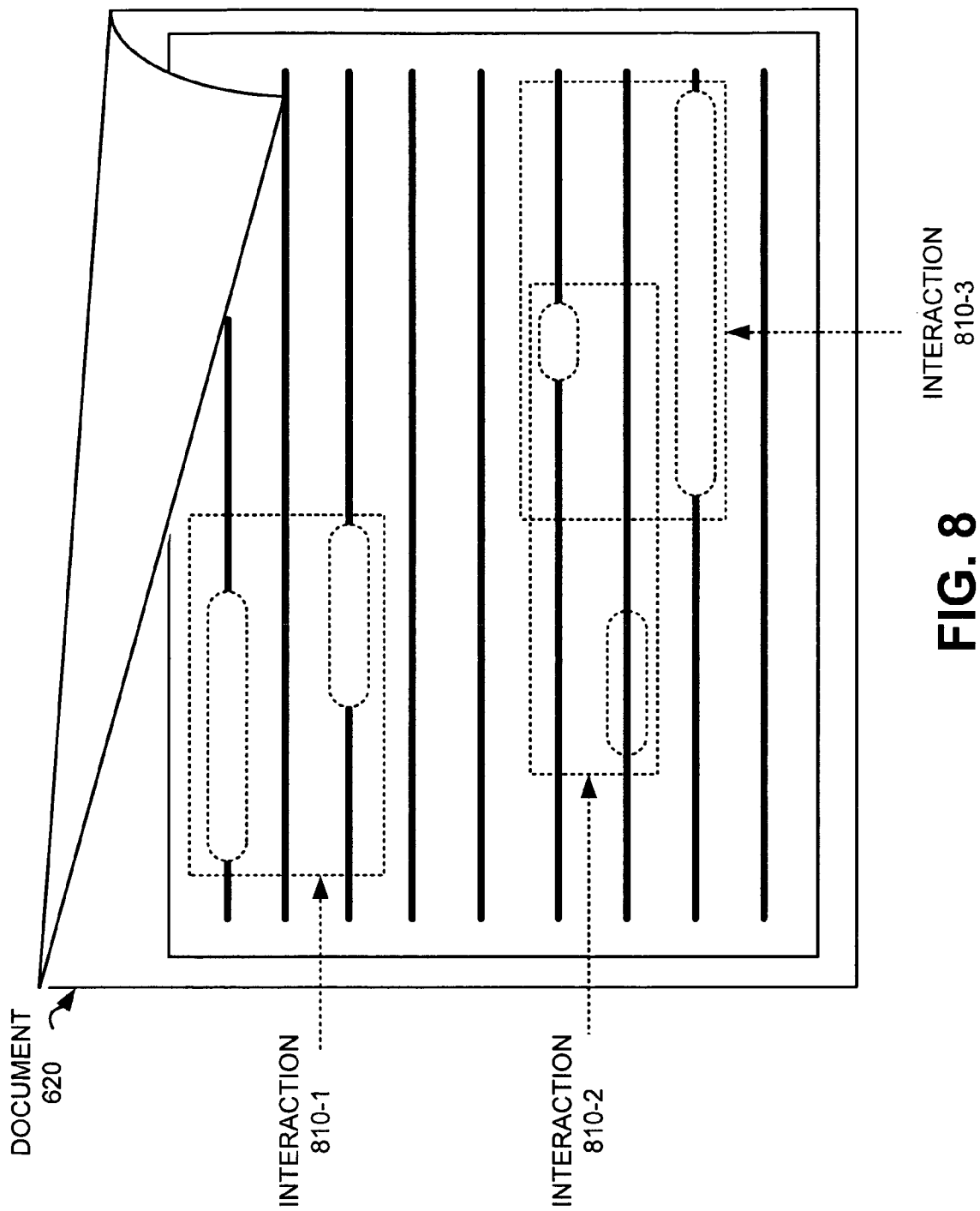
FIG. 8 is a diagram that illustrates the identification of interactions between information nuggets within an exemplary document consistent with an aspect of the invention.

Each interaction i between information nuggets (t) in document $A_j$ may be determined (block 515). An interaction i in document $A_i$ may include a pair of information nuggets occurring in close proximity (e.g., within a clause, a sentence or paragraph of one another). In the example, "Prince Charles announced his intention to marry Camilla Parker-Bowles," "Prince Charles" and "Camilla Parker-Bowles" may represent an "interaction." FIG. 8 illustrates interactions 810-1 through 810-3 determined for pairs of information nuggets in the exemplary document 620 of FIG. 6.

Figure 9:
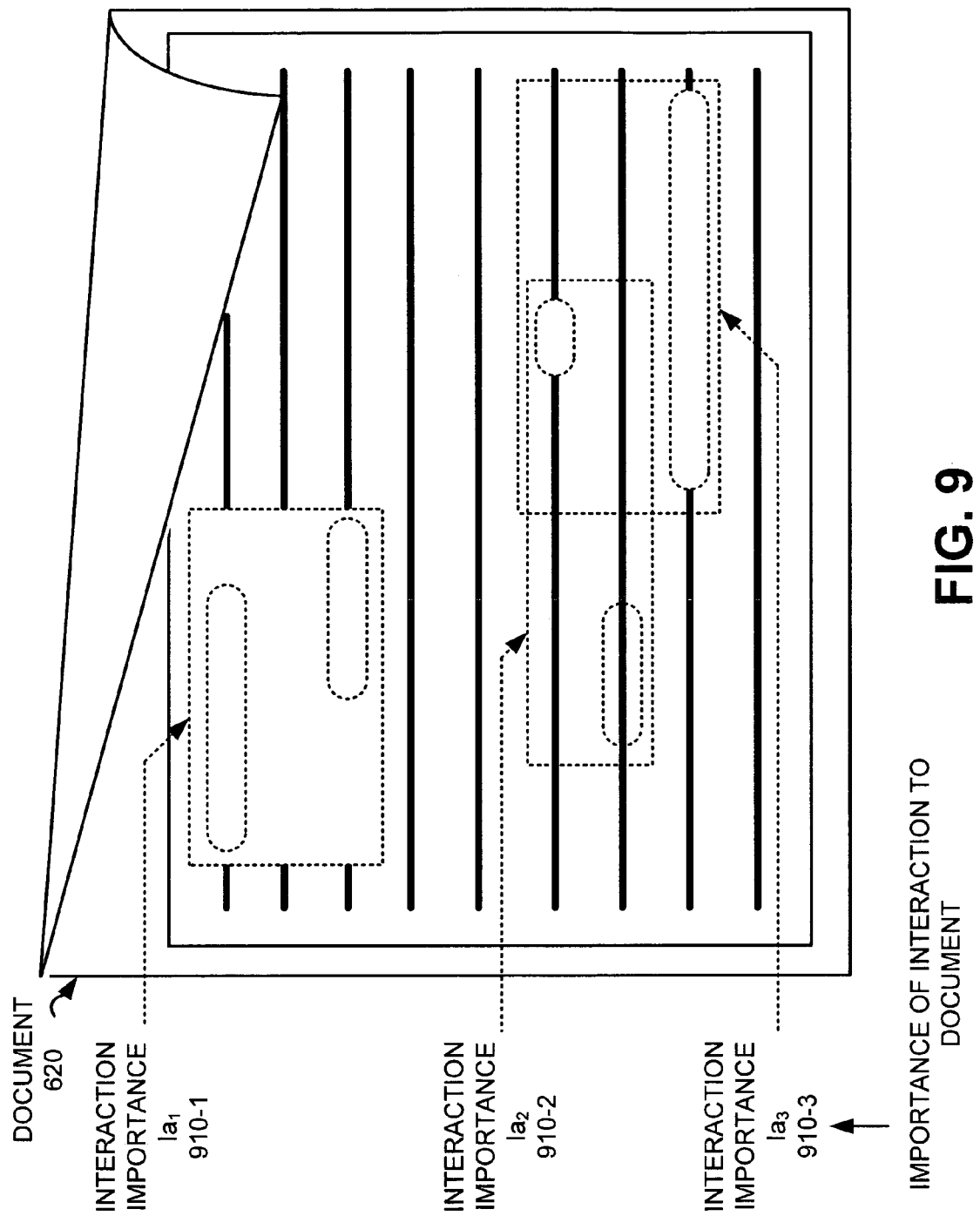
FIG. 9 is a diagram that illustrates the determination of the importance of interactions within an exemplary document consistent with an aspect of the invention.

For each interaction i in document $A_j$, an importance value ($I_a(i, A_j)$) of the interaction to the document may be determined (block 520). The importance value $I_a(i, A_j)$ may be determine using various techniques. In one implementation, $I_a(i, A_j)$ may equal TF(i, a), where TF(i, a) is a term frequency of interaction i in document A and is proportional to the number of occurrences of i in document A (e.g., equal to the number of occurrences of i in A). In another implementation, TF(i, A) may be replaced by WTF(i, A) which represents a depth weighted sum of matches of i in document A:

$$WTF(i, A) = \sum \frac{\text{sentences } s \text{ containing pair } i \text{ in } A}{\sqrt{\text{depth of sentence } s \text{ in } A}} \qquad \text{Eqn. (3)}$$

where "depth of sentence s in A" is the number of sentences before sentence s in A. FIG. 9 illustrates interaction importance values 910-1 through 910-3 determined for each of the interactions of the exemplary document 620 of FIG. 8.

A determination may be made whether there is another document in sequence S that has not been analyzed (block 525). If so, counter j may be incremented (I=j+1), and the exemplary process may return to block 510 for analysis of a next document in sequence S. If all documents in sequence S have been analyzed, then, for each information nugget t contained in any of the documents of sequence S, an importance ($N_s(t, S)$) of nugget t to the sequence of documents S may be determined (block 535). $N_s(t, S)$ may measure the importance of nugget t to a given sequence S of documents and may be computed as one of, or a combination of, the following quantities:

1) frequency: a number of documents in sequence S that contain nugget t;
2) cumulative $N_a$: a sum of $N_a(t, A)$ for all documents A in sequence S;
3) cumulative squashed $N_a$: a sum of $\log(N_a(t, A))$ for all documents A in sequence S;
4) total interaction importance: a sum of $I_a(i, S)$ over all interactions i that involve nugget t; or
5) max interaction importance: a sum of $M_a(i, S)$ over all interactions i that involve nugget t. $M_a(i, S)$ is the maximum $I_a(i, A)$ over all documents A in sequence S.

Figure 10:
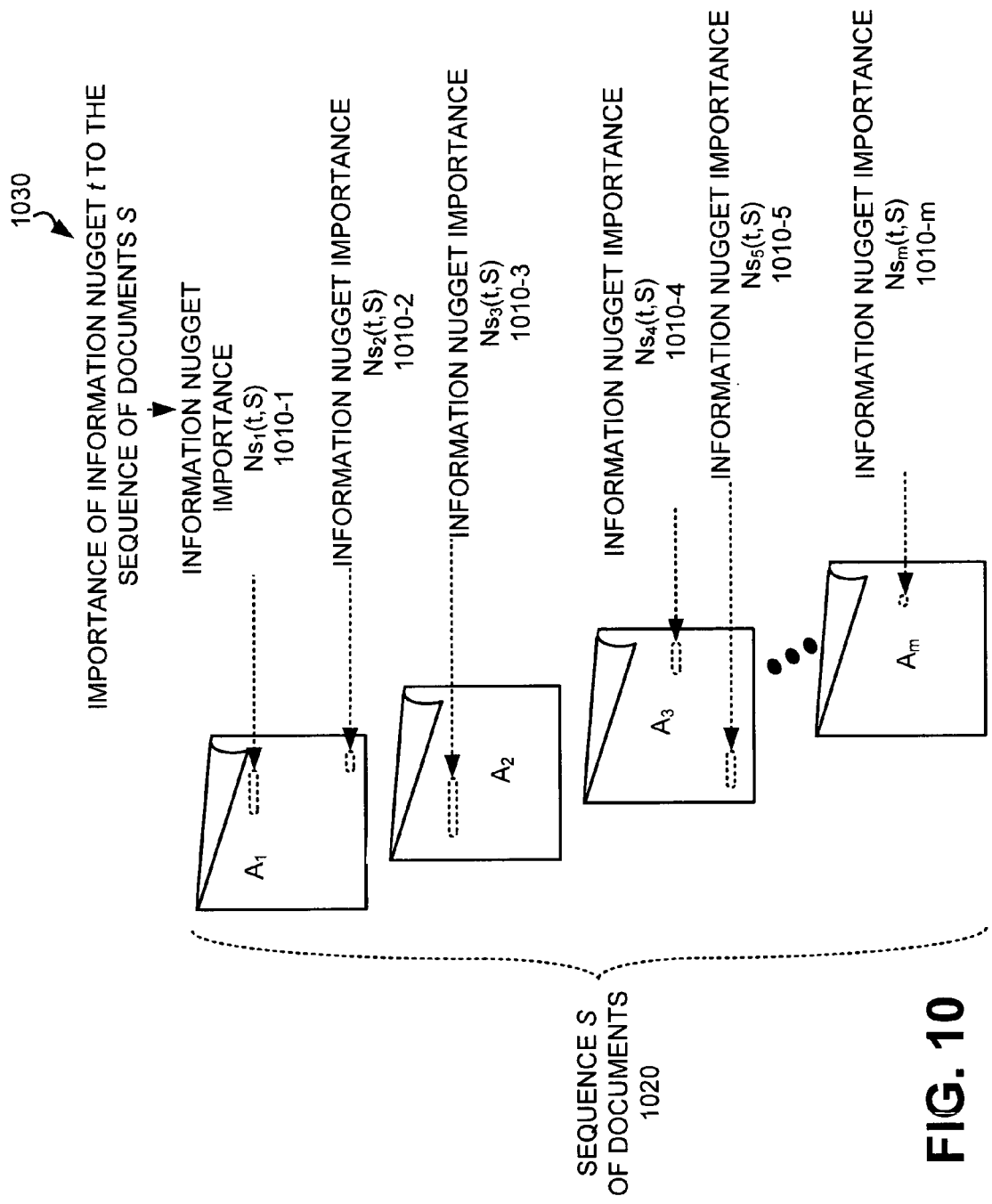
FIG. 10 is a diagram that illustrates the determination of the importance of information nuggets contained within a sequence of documents consistent with an aspect of the invention.

FIG. 10 illustrates information nugget importance values 1010-1 through 1010-m, determined for documents of sequence S 1020, that identify 1030 the importance of each respective information nugget t to the sequence of documents S.

For each interaction i contained in any of the documents of sequence S, an importance ($I_s(i, S)$) of the interaction i to the sequence of documents S may be determined (block 540). $I_s(i, S)$ may measure the importance of interaction i to a given sequence of documents S and may be computed as one of, or a combination of, the following quantities:

1) frequency: a number of documents in sequence S that contain the interaction i;
2) cumulative $I_a$: a sum of $I_a(i, A)$ for all documents A in sequence S;
3) cumulative squashed $I_a$: a sum of $\log(I_a(i, A))$ for all documents A in sequence S;
4) product of nugget importance: $N_s(t_1, S) * N_s(t_2, S)$ for the interaction between nugget $t_1$ and nugget $t_2$.

Figure 11:
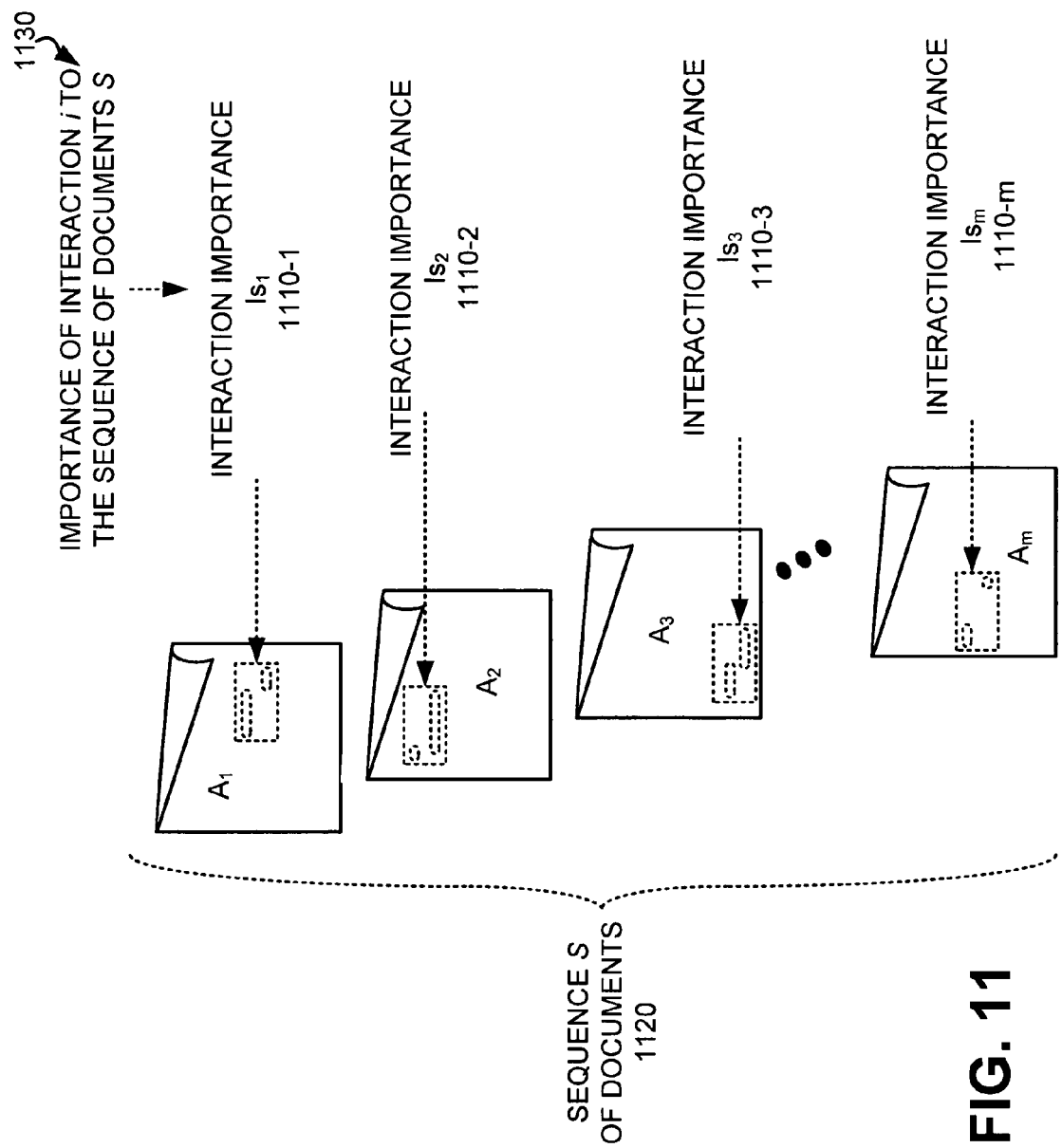
FIG. 11 is a diagram that illustrates the determination of the importance of interactions contained within a sequence of documents consistent with an aspect of the invention.

FIG. 11 illustrates interaction importance values 1110-1 through 1110-m, determined for documents of sequence S 1120, that identify 1130 the importance of each respective interaction i to the sequence of documents S.

Figure 12:
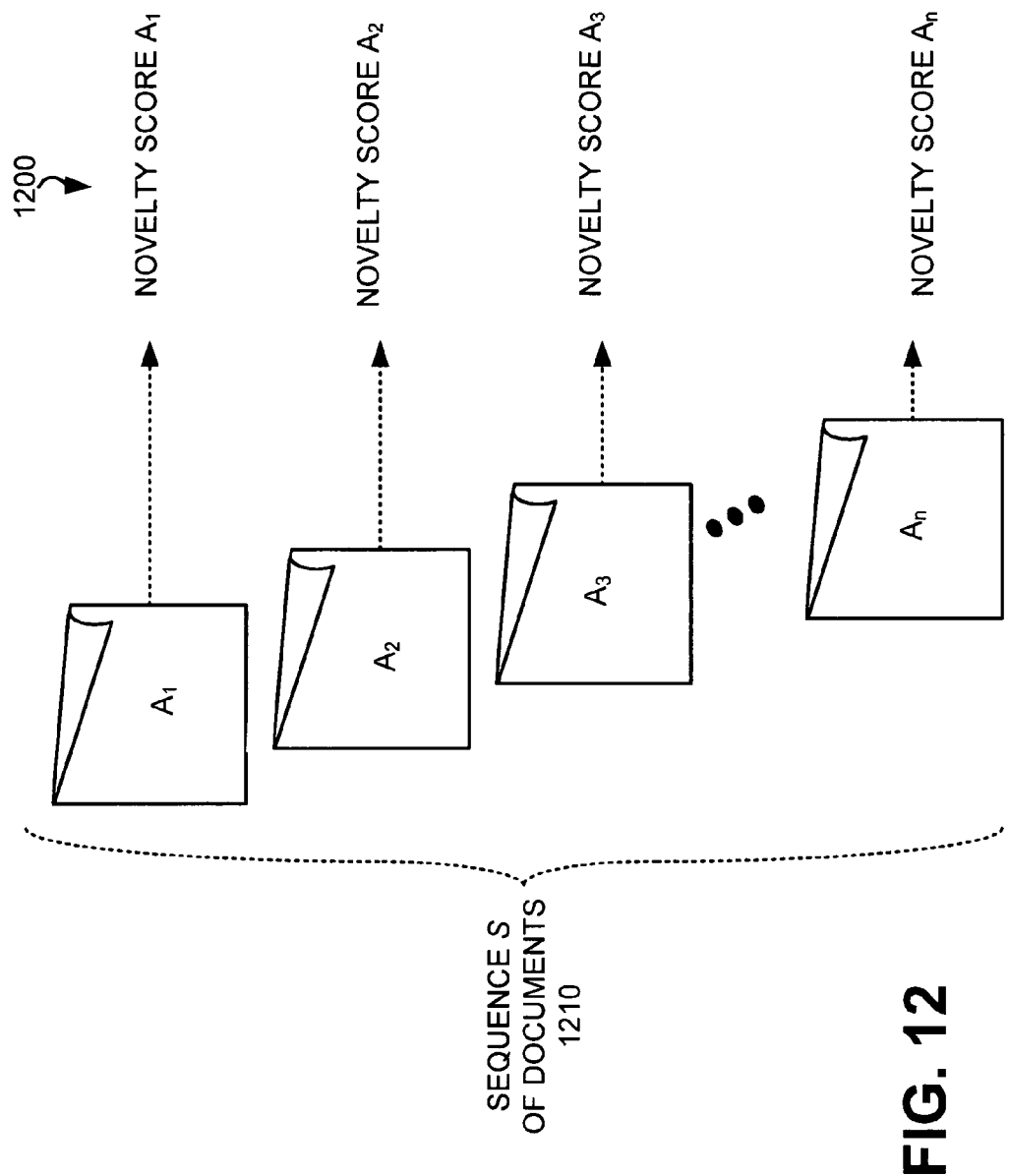
FIG. 12 is a diagram that illustrates the assignment of novelty scores to documents in a sequence of documents consistent with an aspect of the invention.

A novelty score ($NOV_A$) for each document A of sequence S may be determined (block 545). The novelty score may measure the importance of document A to sequence S. The novelty score may be computed as one of, or a combination of, the following quantities:

1) sigma $N_s(t, S)$ for all nuggets t that document A introduced for a first time (sigma $N_s(t, S)$ equals the sum of $N_s$ for all nuggets t that document A introduced for a first time);
2) Total improvement of nuggets: a sum of the improvement to all of the nuggets covered in document A. Let $S_1$ be documents in the sequence S of documents that are earlier in the sequence than document A. The improvement to a nugget t for document A may be measured in one of the following ways:
   a) delta importance: $N_s(t, \{S_1, A\}) - N_s(t, S_1)$ over all nuggets t in document A;
   b) normalized delta importance: $(N_s(t, \{S_1, A\}) - N_s(t, S_1)) / Ns(t, \{S_1, A\})$
   c) normalized delta importance * $N_s(t, S)$
3) sigma $I_s(i, S)$ for all interactions i that document A introduced for a first time;
4) Total improvement of interactions: a sum of the improvement to all of the interactions identified in document A. The improvement to interaction i by document A may be measured in one of, or a combination of, the following ways:
   a) delta importance: $I_s(i, \{S_1, A\}) - I_s(i, S_1)$ over all interactions i in document A;
   b) normalized delta importance: $(I_s(i, \{S_1, A\}) - I_s(i, S_1)) / I_s(t, \{S_1, A\})$
   c) normalized delta importance * $I_s(i, S)$ Any combination of the quantities 1) through 4) described above may be used to measure the novelty of a document. For example, in one implementation, the quantities of 2(c) and 4(c) described above may be summed to measure the novelty of a document. FIG. 12 illustrates the assignment of novelty scores 1200 to each respective document of sequence S of documents 1210. The assigned novelty scores may subsequently be used for ranking the documents of the sequence S of documents. The assigned novelty scores may also be used to assess the information content of a respective document, for ranking clusters of documents, or for selecting which document or cluster of documents to display to a user.

In long lasting document sequences (i.e., sequences covering a long time period), information nuggets and interactions seen in documents that are separated by a considerable length of time may not be relevant in estimating the importance of the given document. Thus, when computing the importance of a document to a sequence of documents, the subset of the sequence extending from $T_1$ days before the document to $T_2$ days after the document (e.g., $T_1=7$, $T_2=7$) may be considered.

CONCLUSION

The foregoing description of implementations consistent with principles of the invention provides illustration and description, but is not intended to be exhaustive or to limit the invention to the precise form disclosed. Modifications and variations are possible in light of the above teachings, or may be acquired from practice of the invention. For example, while series of acts have been described with regard to FIGS. 4, 5A and 5B, the order of the acts may be modified in other implementations consistent with the principles of the invention. Further, non-dependent acts may be performed in parallel. Additionally, instead of crediting the document which introduced a given information nugget or interaction, as described above with respect to some aspects of the invention, the credit can be divided over all documents that are within time T of the first introduction (e.g., T=15 minutes).

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects have been described without reference to the specific software code, it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computer-implemented method, comprising:
    determining an ordered sequence of documents;
    determining an amount of novel content contained in each document of the ordered sequence of documents by identifying one or more pairs of textual sequences that occur in close proximity to one another in a respective document;
    assigning a novelty score to each document based on the determined amount of novel content; and
    providing the documents of the ordered sequence of documents based on the assigned novelty scores.

2. The computer-implemented method of claim 1, wherein the textual sequences comprise one or more of named entities, document title terms, or numbers.

3. The computer-implemented method of claim 1, wherein determining an amount of novel content further comprises:
    determining an indication of importance of each of the identified one or more pairs to a respective document of the ordered sequence of documents.

4. The computer-implemented method of claim 3, wherein determining an indication of importance of each of the identified one or more pairs comprises:
    determining an importance value $I_a(i, A)$ as equal to $TF(i, A)$,
    where i is a pair of the one or more pairs contained in a document A, and
    $TF(t, A)$ is a term frequency of the pair i in document A.

5. The computer-implemented method of claim 3, wherein determining an indication of importance of each of the identified one or more pairs comprises:
    determining an importance value $I_a(i, A)$ as equal to WTF $(i, A)$,
    where i is a pair of the one or more pairs contained in a document A, and $$WTF(i, A) = \sum \frac{\text{sentences } s \text{ containing pair } i \text{ in } A}{\sqrt{\text{depth of sentence } s \text{ in } A}}.$$

6. The computer-implemented method of claim 1, wherein determining an amount of novel content further comprises:
    determining an indication of importance of each of the identified one or more pairs to the ordered sequence of documents.

7. The computer-implemented method of claim 6, wherein determining the indication of importance of each of the identified one or more pairs comprises:
    determining an importance value $I_s(i, S)$ that measures the importance of a pair i of the one or more pairs to the ordered sequence of documents, wherein $I_s(i, S)$ is computed based on one or more of the following quantities:
    a) a number of documents in the ordered sequence of documents that contain the pair i;
    b) a sum of $I_a(i, A)$ for all documents A in the ordered sequence of documents;
    c) a sum of $\log(I_a(i, A)$ for all documents A in the ordered sequence of documents; or
    d) $N_s(t_1, S) * N_s(t_2, S)$ for pair i comprising identified textual sequences $t_1$ and $t_2$.

8. The computer-implemented method of claim 7, wherein assigning a novelty score to each document comprises:
    determining sigma($I_s(i, S)$) for all of the one or more pairs that a respective document introduced for a first time in the ordered sequence of documents.

9. The computer-implemented method of claim 7, wherein assigning a novelty score to each document comprises:
    determining a sum of improvement values for all of the pairs of the one or more pairs contained in the document, wherein an improvement value for a pair of the one or more pairs of a respective document A comprises one or more of the following:
    a) $I_s(i, \{S_1, A\}) - I_s(i, S_1)$ over all pairs contained in the document;
    b) $(I_s(i, \{S_1, A\}) - I_s(i, S_1))/I_s(t, \{S_1, A\})$; or
    c) $((I_s(i, \{S_1, A\}) - I_s(i, S_1))/I_s(t, \{S_1, A\})) * I_s(i, S)$,
    where $S_1$ comprises documents in the sequence of documents that are earlier in the sequence than document A.

10. The computer-implemented method of claim 1, further comprising:
    ranking the documents based on the assigned novelty scores.

11. The computer-implemented method of claim 10, where the providing includes:
    displaying one or more of the documents based on the ranking.

12. A computer-implemented method, comprising:
    identifying textual sequences that carry information within a document of a plurality of documents;
    determining an importance value $N_a(t, A)$ of each of the identified textual sequences as equal to $TF(t, A) * WTF(t, A)$,
    where t is an identified textual sequence contained in the document,
    A is the document,
    $TF(t, A)$ is the term frequency of textual sequence t in document A, and $$WTF(i, A) = \sum \frac{\text{sentences } s \text{ containing pair } i \text{ in } A}{\sqrt{\text{depth of sentence } s \text{ in } A}};$$

assigning a score to the document of the plurality of documents based on the importance value of each of the identified textual sequences to the document, the assigned score indicating the presence of content in the document that is novel relative to content in other documents of the plurality of documents;

ranking the document among the other documents of the plurality of documents based on the assigned score; and displaying the document among other documents based on the ranking.

13. The method of claim 12, wherein the textual sequences comprise one or more of named entities, document title terms, or numbers.

14. The computer-implemented method of claim 12, wherein assigning a score to a document further comprises:

identifying one or more pairs of the one or more textual sequences that occur in close proximity to one another in the document.

15. The computer-implemented method of claim 14, further comprising:

determining an indication of importance of each of the identified one or more pairs to the document.

16. The computer-implemented method of claim 15, wherein determining an indication of importance of each of the identified one or more pairs comprises:

determining an importance value $I_a(i, A)$ as equal to WTF $(i, A)$, where i is a pair of the one or more pairs contained in the document, A is the document, and $$WTF(i, A) = \sum \frac{\text{sentences } s \text{ containing pair } i \text{ in } A}{\sqrt{\text{depth of sentence } s \text{ in } A}}.$$

17. The computer-implemented method of claim 12, wherein assigning a score to a document further comprises:

determining an indication of importance of each of the identified textual sequences to the plurality of documents.

18. The computer-implemented method of claim 17, wherein determining an indication of importance of each of the identified textual sequences to the plurality of documents comprises:

determining an importance value $N_s(t, A)$ that measures the importance of an identified textual sequence t to the plurality of documents, wherein $N_s(t, A)$ is computed based on one or more of the following quantities:

a) a number of documents in the plurality of documents that contain the identified textual sequence t;

b) a sum of $N_a(t, A)$ for all documents A in the plurality of documents;

c) a sum of $\log(N_a(t, A))$ for all documents A in the plurality of documents;

d) a sum of $I_a(i, S)$ over all interactions i in the plurality of documents that involve identified textual sequence t; or e) a sum of $M_a(i, S)$ over all interactions i in the plurality of documents that involve the identified textual sequence t, wherein $M_a(i, S)$ is the maximum $I_a(i, A)$ over all documents A in the plurality of documents.

19. The computer-implemented method of claim 14, wherein assigning a score to a document further comprises:

determining an indication of importance of each of the identified one or more pairs to the plurality of documents.

20. The method of claim 19, wherein determining the indication of importance of each of the identified one or more pairs to the plurality of documents comprises:

determining an importance value $I_s(i, S)$ that measures the importance of a pair i of the one or more pairs to the plurality of documents, wherein $I_s(i, S)$ is computed based on one or more of the following quantities:

a) a number of documents in the plurality of documents that contain the pair i;

b) a sum of $I_a(i, A)$ for all documents A in the plurality of documents;

c) a sum of $\log(I_a(i, A))$ for all documents A in the plurality of documents;

d) $N_s(t_1, S) * Ns(t_2, S)$ for pair i comprising identified textual sequences $t_1$ and $t_2$.

21. The computer-implemented method of claim 20, wherein assigning a score to a document further comprises:

measuring an indication of importance of the document relative to the plurality of documents.

22. The computer-implemented method of claim 19, wherein measuring an importance of the document comprises:

determining sigma $(N_s(t, S))$ for all identified textual sequences t that the document introduced for the first time in the plurality of documents.

23. The computer-implemented method of claim 21, wherein measuring an indication of importance of the document comprises:

determining sigma $(I_s(i, S))$ for all of the one or more pairs that the document introduced for a first time in the plurality of documents.

24. The computer-implemented method of claim 21, wherein measuring an indication of importance of the document comprises:

determining a sum of improvement values for all of the identified textual sequences contained in the document, wherein an improvement for an identified textual sequence t of the document A comprises one or more of the following:

a) $N_s(t, \{S_1, A\}) - N_s(t, S_1)$ over all identified textual sequences contained in the document A;

b) $(N_s(t, \{S_1, A\}) - N_s(t, S_1))/N_s(t, \{S_1, A\})$; or c) $((N_s(t, \{S_1, A\}) - N_s(t, S_1))/N_s(t, \{S_1, A\})) * N_s(t, S)$, where $S_1$ comprises documents in the sequence of documents that are temporally earlier in the plurality of documents than document A.

25. The computer-implemented method of claim 21, wherein measuring an indication of importance of the document comprises:

determining a sum of improvement values for all of the pairs of the one or more pairs contained in the document, wherein an improvement for a pair of the one or more pairs for the document A comprises one or more of the following:

a) $I_s(i, \{S_1, A\}) - Is(i, S_1)$ over all pairs contained in the document A;

b) $I_s(i, \{S_1, A\}) - I_s(i, S_1))I_s(t, \{S_1, A\}))$; or c) $((I_s(i, \{S_1, A\}) - I_s(i, S_1))/I_s(t, \{S_1, A\})) * I_s(i, S)$, where $S_1$ comprises documents in the sequence of documents that are temporally earlier in the plurality of documents than document A.

26. A computer-implemented method, comprising:

identifying one or more textual sequences that carry information in a document of a plurality of documents;

determining an indication of importance of each of the textual sequences relative to the plurality of documents;

assigning a score to the document based on the determined indication of importance of each of the textual sequences; and providing the document among other documents based on the assigned score.

27. The computer-implemented method of claim 26, further comprising:

ranking the document among the plurality of documents based on the assigned score.

28. The computer-implemented method of claim 27, where the providing includes:

displaying the document among other documents based on the ranking.

29. The computer-implemented method of claim 26, further comprising:

identifying one or more pairs of the one or more textual sequences that occur in close proximity to one another in the document; and determining an importance of each of the one or more pairs relative to the plurality of documents.

30. The computer-implemented method of claim 29, wherein assigning the score to the document is further based on the determined importance of each of the one or more pairs.

31. A computer-readable memory device that stores computer-executable instructions, comprising:

instructions for obtaining an ordered sequence of documents;

instructions for determining an amount of novel content contained in each document of the ordered sequence of documents by identifying one or more pairs of textual sequences that occur in close proximity to one another in a respective document;

instructions for assigning novelty scores to the documents based on the determined amount of novel content; and instructions for providing the documents of the ordered sequence of documents based on the assigned novelty scores.

32. A computer-implemented system, comprising:

means for identifying one or more textual sequences that carry information in a document of a plurality of documents;

means for determining an indication of importance of each of the textual sequences relative to the plurality of documents;

means for assigning a score to the document based on the determined indication of importance of each of the textual sequences; and means for providing the document among other documents based on the assigned score.

\* \* \* \* \*

UNITED STATES PATENT AND TRADEMARK OFFICE
CERTIFICATE OF CORRECTION

PATENT NO.         : 7,451,120 B1
APPLICATION NO. : 11/378628
DATED              : November 11, 2008
INVENTOR(S)        : M. Bharath Kumar et al.

It is certified that error appears in the above-identified patent and that said Letters Patent is hereby corrected as shown below:

Column 10, line 60, reads

" $WTF(i, A) = \sum \dfrac{\text{sentences } s \text{ containing pair } i \text{ in } A}{\sqrt{\text{depth of sentence } s \text{ in } A}}$ " and should read as follows:

" $WTF(t, A) = \sum \dfrac{\text{sentences } s \text{ containing textual sequence } t \text{ in document } A}{\sqrt{\text{depth of sentence } s \text{ in } A}}$ ; "

Signed and Sealed this

Twenty-first Day of April, 2009

JOHN DOLL
*Acting Director of the United States Patent and Trademark Office*